United States Patent [19]

Turner

[11] 4,092,863

[45] June 6, 1978

[54] ELECTRONIC THERMOMETER CIRCUIT

[75] Inventor: Robert B. Turner, Weymouth, Mass.

[73] Assignee: Johnson & Johnson, New Brunswick, N.J.

[21] Appl. No.: 758,630

[22] Filed: Jan. 12, 1977

[51] Int. Cl.² ............................................. G01K 7/24
[52] U.S. Cl. ............................. 73/362 AR; 73/359 R
[58] Field of Search ............. 73/359, 362 R, 362 AR, 73/362 SC, 432 CR

[56] References Cited

U.S. PATENT DOCUMENTS

| | | | |
|---|---|---|---|
| 3,877,307 | 4/1975 | Georgi | 73/362 AR |
| 3,965,743 | 6/1976 | Turner | 73/362 AR |
| 3,972,237 | 8/1976 | Turner | 73/362 AR |

Primary Examiner—Charles A. Ruehl
Attorney, Agent, or Firm—Audley A. Ciamporcero, Jr.

[57] ABSTRACT

In a medical electronic thermometer system comprising a temperature sensing circuit for providing an analog signal representative of temperature being sensed, this temperature sensing circuit including a temperature transducer having a time lagged output; a voltage to rate converter responsive to the analog signal for providing uniform digital pulses at a repetition rate proportional to the temperature being sensed; and a digital decoder and display for displaying the temperature being sensed; an improved predictive circuit within the temperature sensing circuit for compensating for transducer lag and for enabling determination of ultimate temperature in advance of signal levels from the transducer indicative of such ultimate temperature, this predictive circuit generating a dual scale factor error curve.

8 Claims, 6 Drawing Figures

ELECTRONIC THERMOMETER CIRCUIT

BACKGROUND OF THE INVENTION

Conventional medical electronic thermometers use a sensing element, e.g., thermocouple, thermistor or diode, whose electrical characteristics change to change voltage or current circuit output as a function of the ambient temperature of the environment in which sensing element is immersed. The electrical signal provided by such a sensing element or temperature transducer is then measured as relating to the ambient temperature. As the transducers do not heat up to ambient temperature instantaneously, the output of these temperature transducers will lag in instantaneous actual temperature being measured as a function of the heat transfer curve of the individual transducer.

Medical electronic thermometers having anticipation or predictive components which enable the actual ambient temperature being measured to be calculated in advance of a true indication of this temperature from the transducer have been recently developed. These thermometers predict the final temperature in a number of ways. Georgi, U.S. Pat. No. 3,702,076, recognizing that the output of the temperature transducer follows the decaying exponential curve describing the heat transfer characteristics of the transducer, predicts the final value or the asymptote which the curve approaches by adding a fixed increment to the transducer signal at a fixed time after the transducer has been introduced to the ambient temperature being measured determined by the time between error pulses which controls the balance of a bridge circuit.

Kauffeld, U.S. Pat. No. 3,872,726, predicts the asymptote to the decaying exponential curve, i.e., the steady state or final transducer temperature, by looking for a specific rate of change in the response curve which is then correlated to the point where the transducer output is a predetermined increment below final value. This point being determined, the fixed increment is added to transducer signal to give the final or steady state value in advance of it actually being reached.

Goldstein, U.S. Pat. No. 3,978,325, predicts the asymptote to the curve, the final value which the transducer will produce, by mathematically computing it by solving the equation for the curve having obtained two points on the curve.

The Georgi and the Kauffeld predictive circuits require a relatively long period before they are able to make a prediction. As much as 90% of ultimate transducer temperature excursion must occur before a prediction is available. The Goldstein circuit must also wait a relatively long period in order to obtain two sample points. Sample points which are too close together require exacting arithmetic calculation implementation and too large a computational unit for a medical electronic thermometer.

This inventor, with a previous invention U.S. Pat. No. 3,972,237, also teaches a prediction circuit. This circuit recognizes the fact that the transducer heat transfer curve of the temperature transducer and therefore the transducer output signal response is an exponential curve which approaches an asymptote similarly to the operation of a system which approximates a critically-damped control system following a first derivative curve. By generating a second derivative error curve which can be added to the first derivative curve the steady state approximation which translates into the final output value of the temperature transducer may be obtained in advance. Like the other circuits referenced above, this predictive circuit will yield a more accurate prediction only when precise circuit component values are used and only after a substantial derivative history has been sampled.

SUMMARY OF THE INVENTION

The objectives of this invention are achieved in a medical electronic thermometer system having a temperature sensing circuit for providing an analog signal representative of temperature being sensed as a function of the output of a temperature transducer. Included in said temperature sensing circuit is a predictive component for compensating for lag in transducer output for determining the ultimate temperature sensed in advance of a steady state signal from said transducer. Firstly, a second derivative curve is generated, and secondly, a multiplier factor is introduced into this curve generation to produce a second scaled curve. The generated curves provide a signal indicative of the steady state output of the transducer.

A voltage to rate converter responsive to the sum of the generated curves and the output of the transducer provides digital pulses at a rate proportional to voltage input.

A digital decoder receives the digital pulse output from the voltage to rate converter and drives a display of the temperature predicted.

An objective of this invention is to provide an improved anticipation circuit design which yields a steady state temperature prediction with a quicker transducer output signal sampling.

A further objective is to provide a more accurate quicker sampling circuit.

An even further objective is for this circuit to minimize the error contributing transient signals during prediction.

DESCRIPTION OF THE DRAWINGS

The various objects, advantages and features of this invention will become more readily apparent from the following detailed description and appended claims read with the accompanying drawings in which like numerals refer to like elements and in which:

DETAILED DESCRIPTION OF THE INVENTION

Figure 1:
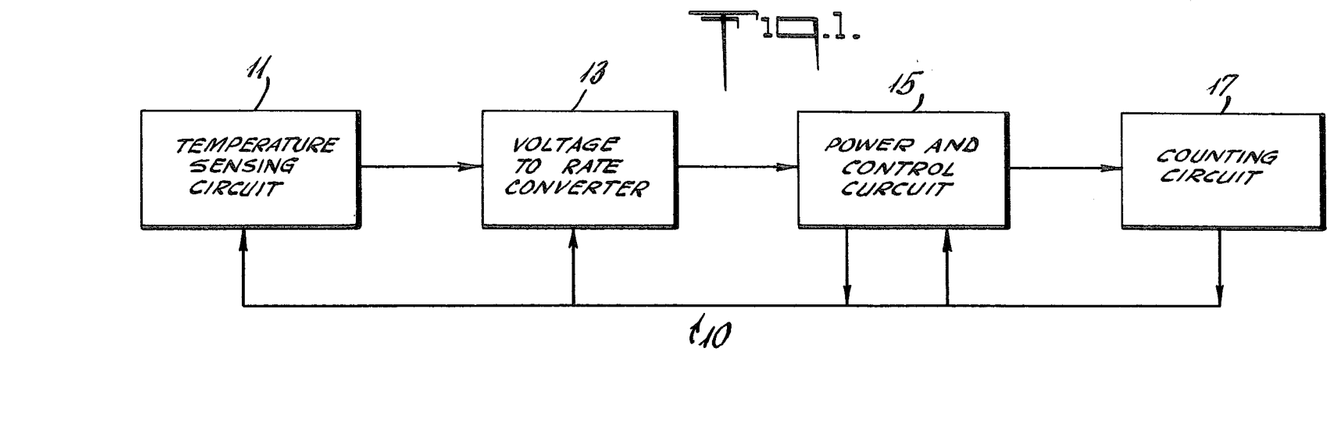
FIG. 1 is a general block diagram of the electronic thermometer circuit using the anticipation circuit according to this invention.

An electronic thermometer system 10, FIG. 1, according to this invention includes a temperature sensing circuit 11 connected to drive a voltage to rate converter 13 which is in turn connected to a power and control circuit 15 and then a counting circuit 17. Supplemental or additional electrical connections between each of these components are also provided. The temperature sensing circuit 11 senses the ambient temperature in which it is present and provides an analog signal representative thereof to the voltage to rate converter 13. The voltage to rate converter 13 provides at its output terminal digital pulses whose repetition rate is proportional to the analog input signal from the temperature sensing circuit 11, and is therefore representative of the temperature being sensed. These pulses are accumulated by the counting circuit 17. The thermometer system operation is controlled with the power and control circuit 15.

Figure 2:
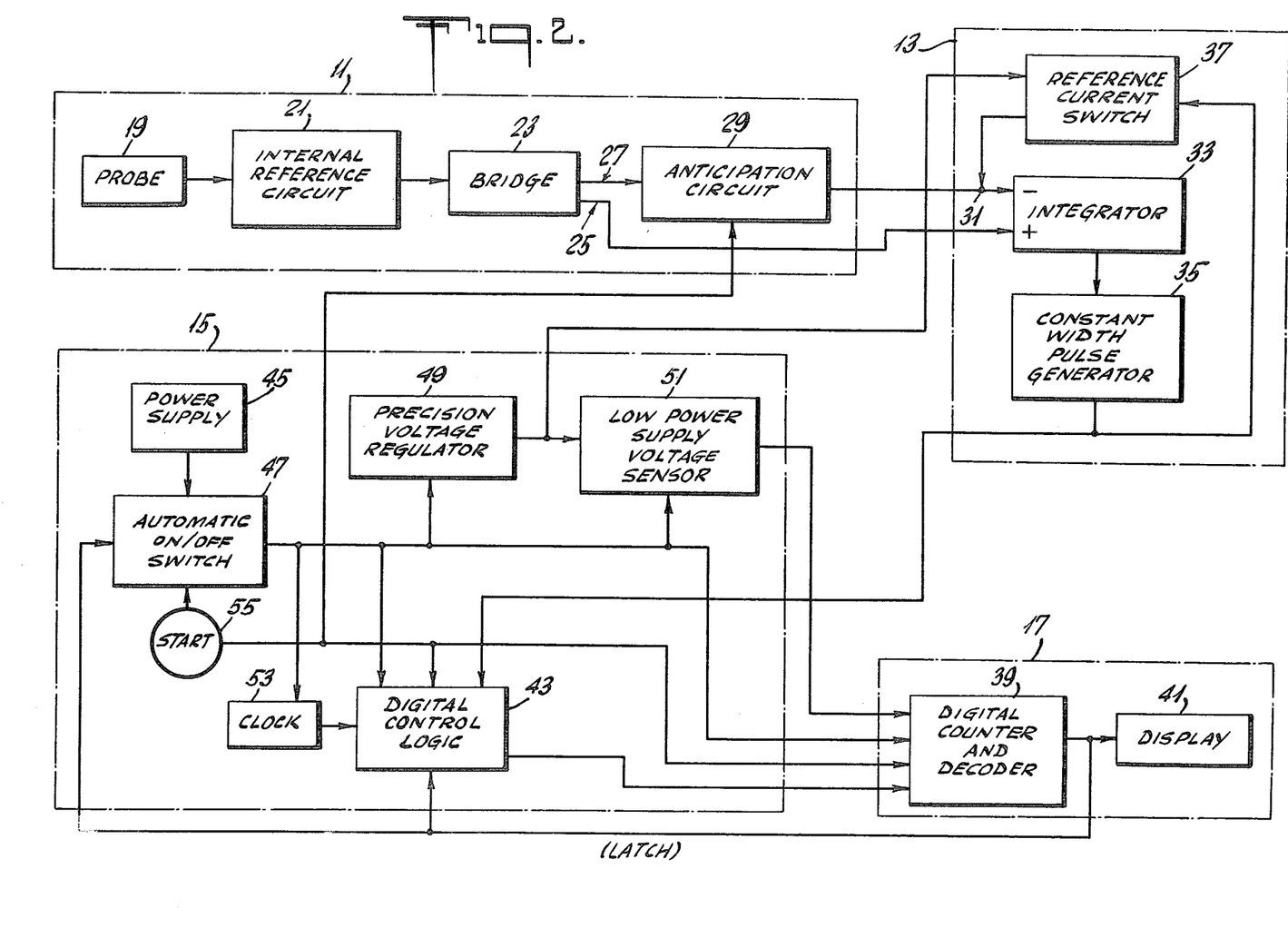
FIG. 2 is a more detailed block diagram of the electronic thermometer circuit containing the improved anticipatory circuitry.

The temperature sensing circuit 11 includes a thermometer containing probe 19, FIG. 2, for sensing a temperature to be measured and then producing an analog signal which is representative of temperature. A signal from the probe 19 is submitted to an internal reference circuit 21 and then to a bridge circuit 23. The internal reference circuit 21 is intended to automatically connect a matching circuit to the bridge circuit 23 when the probe 19 is unplugged. This matching circuit is intended to operate in place of the input from the probe 19 so that the accuracy and operation of the system may be tested. The bridge circuit 23 provides a reference output signal on line 25. An additional output on line 27 provides a varying output signal as a function of the bridge unbalance representing the analog signal which is a function of the temperature sensed by the probe 19. The reference output signal 25 represents a nominal 90° F for a thermometer system which has been set up to operate between 90° and 100° F. The bridge 23 varying output 27 is connected to an anticipation circuit 29 which senses the rate of change in the output of the bridge circuit 23. This rate of change is indicative of a new temperature being sensed by the probe 19 and reflects the lag in the output of the probe 19-bridge 23 circuit due to the heat transfer characteristics of the probe 19. The anticipation circuit 29 modifies the varying signal 27 received from the bridge circuit 23 to provide an output signal at a summing point 31 which is the input to the voltage to rate converter 13. This output signal 27 is representative of the final value which eventually would be received from the bridge circuit 23 when the probe 19 reaches a steady state temperature in the new environment in which it had been placed. The signal therefore provided to the voltage to rate converter 13 by the anticipation circuit 29 is representative of the final temperature being sensed in advance of the actual sensing of that final value.

The summing point 31 input to the voltage to rate converter (V. R. C.) 13 is connected directly into the negative input of an integrator 33, a component within the V. R. C. 13. The positive input of the integrator 33 is connected directly to the reference output 25 of the bridge circuit 23. A difference between the values on the negative and positive inputs to the integrator 33 will cause a positive-sloped ramp to be generated by the integrator 33 at its output terminal. This output is connected to the input of a constant width pulse generator 35, another component within the V. R. C. 13. The constant width pulse generator 35 provides negative going fixed width output pulses when the ramp reaches a predetermined voltage level. These fixed width pulses are delivered along a feedback line to the input of a reference circuit switch 37. This reference circuit switch is intended to produce a positive going fixed width and fixed amplitude pulse to the summing point 31. The presence of this pulse temporarily restores the summing point, therefore the negative input to the integrator 33, to a level equal to the positive input of the integrator 33. This in turn causes the integrator circuit output to drop resulting in a sawtooth output signal. A drop in the integrator 33 output turns off the constant pulse width generator 35. Once the constant pulse width generator 35 has been turned off the negative input to integrator 33 as represented by the voltage at the summing point 31 is free to drift away from the reference input, i.e., the negative input to the integrator 33. Once the two input values drift apart the integrator 33 is again activated to provide another output ramp and the cycle begins anew. The rate of pulses to the summing point 31 as provided by the pulse generator 35 is the factor which adjusts the voltage disparity between the inputs of the integrator 33.

The counting circuit 17 includes a digital counter and decoder circuit 39 which counts digital pulses provided by the constant pulse width generator 35 for a predetermined period or sample time and then decodes that count to drive a display circuit 41 which display circuit displays the measured temperature. The operation of the digital counter and decoded circuit 39 is controlled by the power and control, circuit 15. More specifically, it is controlled by a digital control logic circuit 43 within the power and control circuit 15. As part of this control the output from the constant width pulse generator 35 is fed into the digital counter and decoder circuit 39 via the digital control logic 43.

The power and control circuit 15 includes a power supply 45 and an automatic on-off electronic switch 47 which controls all of the power to the entire electronic thermometer 10. This automatic on-off switch 47 acts to activate and deactivate the various components within the thermometry circuitry 10 as these components are needed. A precision voltage regulator 49 provides a voltage regulated signal to the bridge circuit 23, the reference current switch 37, the integrator circuit 33, the constant width pulse generator 35, and a low power supply voltage sensor 51. A second input to the low power supply voltage sensor 51 comes from the automatic on-off switch 47. This is the unregulated power supply as obtained from the power supply 45. When the unregulated power supply voltage decreases to a predetermined level relative to the regulated voltage output provided by the precision voltage regulator 49 the low power supply voltage sensor 51 provides a signal to the digital counter and decoder circuit 39 causing this circuit 39 to extinguish the least significant digit appearing on the display 41.

A clock 53 supplies digital timing pulses to the digital control logic circuit 43. The operation of this clock 53 is controlled by a signal from the automatic on-off switch 47. A start switch 55 is connected to the automatic on-off switch, the digital control logic 43 and the digital counter and decoder circuitry 39. Additionally, the output of the digital counter and decoder circuitry 39 to the display 41 is monitored by the automatic on-off switch 47 and the digital control logic 43.

Figure 3:
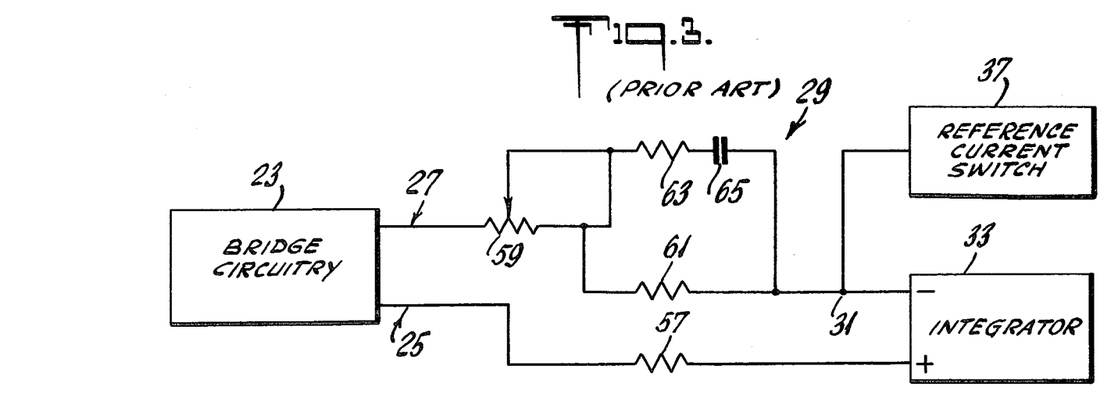
FIG. 3 is a detailed circuit diagram showing the prior predictive circuit.

One implementation for the anticipation circuit 29 as taught by my prior invention U.S. Pat. No. 3,972,237, is shown in FIG. 3. Here the anticipation circuit 29 is implemented by a plurality of passive components of the resistance and capacitance type. A current limiting resistor 57 is placed in the line 25 from the bridge 23 to the positive input of the integrator 33 to provide a reference signal. Connected to line 27 from bridge 23 is a potentiometer 59. This potentiometer 59 has its other resistance terminal connected in series with a resistance 61 to the junction point 31, i.e., the negative input of the integrator 33. The wiper of the potentiometer 59 is connected also to the resistor 61. Connected across the resistance 61 is a resistance 63 and a capacitance 65 in series. These components, potentiometer 59, resistance 61 and 63 and capacitance 65 form an RC filter whose RC time constant is variable as a function of the wiper position of the potentiometer 59. This RC filter acts as a high pass filter which is an approximation to a differentiator.

Figure 4:
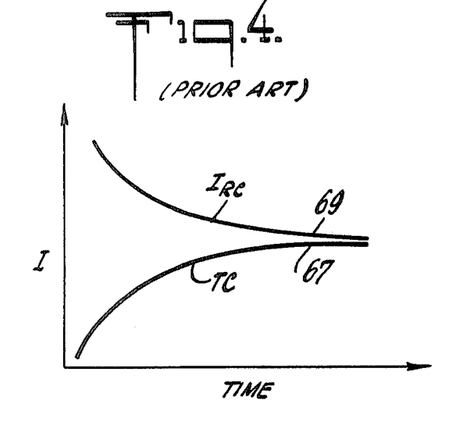
FIG. 4 is a graph illustrating the RC constant of prior predictive circuitry of FIG. 3.

The manner in which this anticipation circuit 29, as illustrated in FIG. 3, operates to provide an advance indication of the final value of the temperature being measured before that final value is actually measured is understood from FIG. 4 which illustrates the thermal time constant 67 of the probe 19 and the current characteristic 69 through the RC network of the previous anticipation circuit. Notice that the curves 67 and 69 closely approximate a mirror image of one another. In fact, the curve 69 is a plot of the derivative of the curve 67. The values at any instantaneous point of time as represented by the curve 69 are the error signals needed to correct the values in the curve 67 to the steady state value or asymptote which the curve 67 eventually approaches. At the beginning of the temperature measuring cycle, when the thermal time constant 67 increase indicates that the temperature of the probe 19 is increasing at a very high rate, the current output on line 27 from the bridge circuit 23 is also changing at a high rate and the capacitor 65 passes this current or conducts heavily. This current is passed to the summing point 31. As the rate of temperature increase slows so does the rate of current increase and thus the current through the capacitor drops off dramatically in advance of the time when the final temperature value is produced by the probe 19.

In order to implement this previous anticipation circuit 29 design, FIG. 3, to yield circuitry which will provide accurate prediction or anticipation of values the RC filter must be designed or timmed to very close values. By the very nature of approximating a differentiator with an RC filter a potential for inaccuracies in signal levels exists. Moreover, as circuit values and tolerances are held less stringently, additional inaccuracies are introduced. The previous circuit design, as herein discussed above, provided accurate temperature anticipation only after a sufficient length of time elapsed enabling the system to be well along the operational curve when the anticipation value was obtained.

Albeit, that it is economically advantageous to approximate a differentiator with an RC filter and it is economically advantageous to use circuit components with broader tolerances, under such design constraints circuit signal inaccuracies can be prevalent. The present improved anticipation circuit 29-A provides an improvement over the previous circuit 29 in that a more accurate anticipation temperature is obtained using equally less expensive circuit components. Moreover, this improved circuitry 29-A is able to minimize and/or eliminate the effects of turn-on transients and other sources of signal error present in the previous circuitry.

Figure 5:
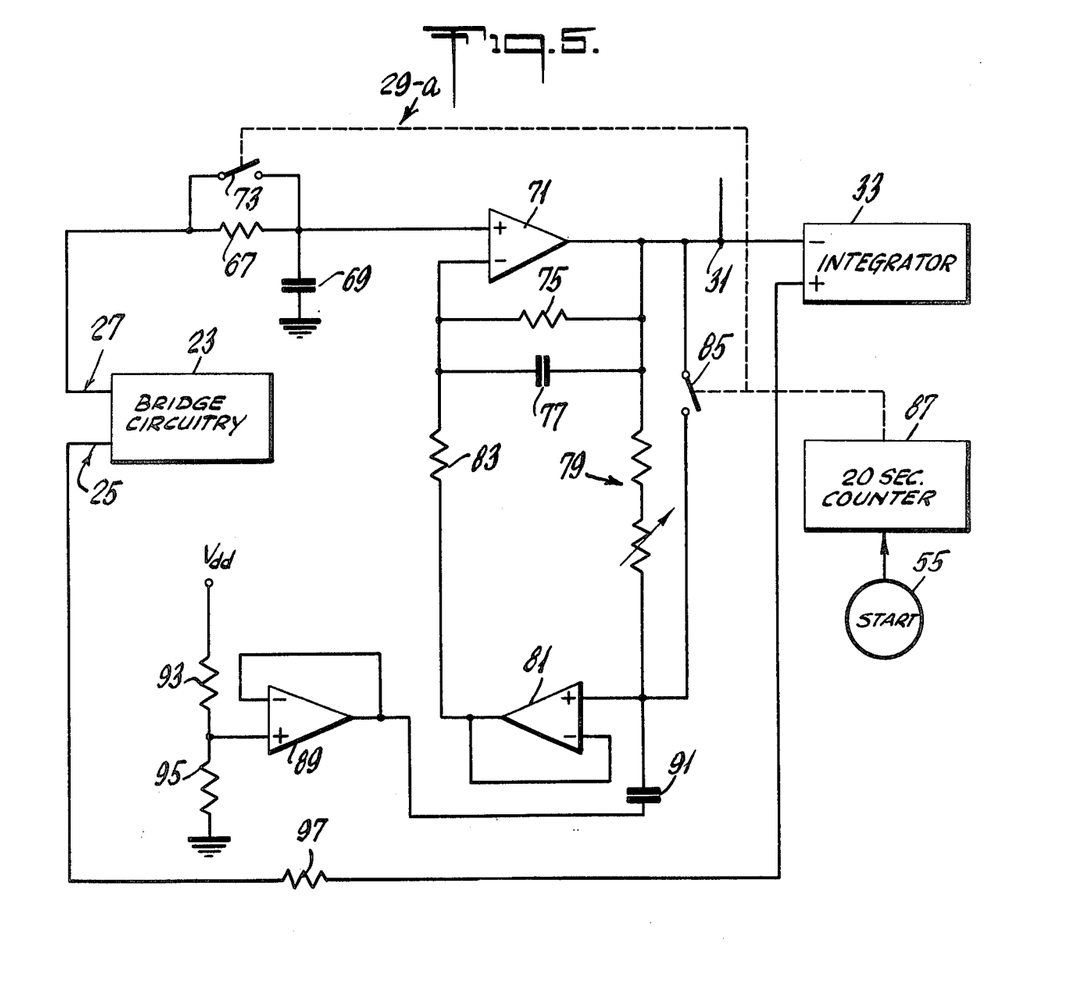
FIG. 5 is a detailed circuit diagram showing the improved anticipatory circuitry of this invention.

The improved anticipation circuit 29-A of this invention is shown in FIG. 5. A low pass RC filter comprising resistance 67 and capacitance 69 is in series with the output line 27 from bridge 23. The capacitance 69 is connected to ground. The output of this filter is connected to the positive input of an operational amplifier 71. Connected across the resistance 67 is a switch 73. With the switch 73 closed the resistance 67 is shunted out of the circuitry. The output of the operational amplifier 71 is connected to the summing point 31 which is synonomous with the negative input of the integrator 33 within V.R.C. 13. A feedback line from the output of the amplifier 71 to its negative input contains a resistance 75 in parallel with a capacitance 77. The capacitance 77 acts as a low pass filter.

The output of the operational amplifier 71 is also connected through a variable resistance 79 to the positive input of a second amplifier 81. The output of this second amplifier 81 is connected to the negative input of the first amplifier 71 through a resistance 83. The negative input of the second amplifier 81 is connected directly to its output so that this amplifier 81 acts as a voltage follower circuit. Connected across the variable resistance 79 is a second switch 85. With this switch closed the resistance 79 is shunted out of the circuitry.

The operation of the switches 73 and 85 is controlled by the output of a 20-second counter 87. This counter 87 is controlled by start switch 55. When the start switch 55 is pushed the 20-second counter initiates a 20-second count. At the end of the 20-second period the switches 73 and 75 which are normally closed are open permitting resistance 67 and 79 to become part of the circuitry.

The positive input to the second amplifier 81 follows the output of amplifier 71. Connected to the input of amplifier 81 is a capacitance 91. An amplifier 89 is connected as a voltage follower, has its output tied to its negative input terminal and to capacitor 91. The positive input terminal of this amplifier 89 is connected to a voltage divider comprising a first resistance 93 and a second resistance 95 connected between a reference voltage $V_{REF}$ and ground. The intersection of the two resistors 93, 95 is connected to the positive terminal of this amplifier 89. Voltage leakage through capacitor 91 is minimized by this amplifier 89 output which has been established by the resistance voltage divider 93, 95 to a level approximately equal to the mid-scale signal level.

As in the previous circuit 29, the line 25 from bridge 23 is connected to the positive input of the integrator 33 through a current limiting resistor 97.

Figure 6:
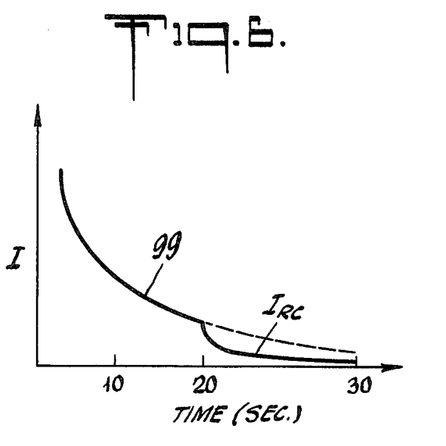
FIG. 6 is a graph illustrating the improved response RC constant of this invention, the circuit of FIG. 5.

This improved circuitry 29-A is capable of operating with the temperature probe 19 which has the response curve 67 as shown in FIG. 4. However, the RC time constant for the improved anticipation circuit 29-A differs from the curve 69 shown in FIG. 4 for the previous circuit 29. FIG. 6 illustrates the time constant response curve 99 for the improved circuit 29-A. This improved response curve 99 as seen in FIG. 6 has some portions similar to the previous response curve 69 especially for the first 20 seconds of operation. However, for time equal to 20 seconds and beyond the improved anticipation circuit operational response curve 99 varies dramatically from the previous circuitry response curve 69. From time equal to 20 seconds and beyond, the exponential part of the equation describing the improved anticipation circuit 29-A response curve is identical to that for the first 20 seconds but the shape of the curve indicates that the response has been altered by a multiplication factor. This multiplication factor can be adjusted by adjusting the ratio of resistances 75 and 83 and in the present embodiment is set at approximately 13.

The time equal 20 seconds period and the scale or multiplication factor of 13 have significant meaning to the operation of this improved circuit 29-A. Not only should the system 10 accurately measure, with an accuracy of 0.1° F or better, over the full scale range of 90° F to 110° F but it should maintain this accuracy (error less than 0.1° F) when the entire system 10 is at room temperature of 40° F to 120° F. At time equal 20 seconds, due to the time constants ($T_c$) of the system 10, signal levels have reached approximately the $3T_c$ or 95 percent level of stabilized level. With a change in gain to 13 the circuitry can track with less than 0.1° F error the temperature being measured when the circuit components are at an ambient temperature of the 40° F to 120° F range.

The improved circuit 29-A provides first an improved component design. By incorporating microelectronic components such as amplifier 71 with its feedback amplifier 81 a much improved differentiator is achieved. Moreover, the low pass input filter (resistance 67 and capacitor 69) tends to filter out erratic signals to the differentiator which may be caused by a shifting at the measuring site of the probe 19. The second operational amplifier 81 provides a more accurate gain through this anticipation portion of the circuitry. The third operational amplifier and its associated capacitor 91 provide a hard reference point into the gain amplifier.

When this circuit 29-A is used however, as with all circuits containing capacitive components, turn-on transients and spurious noise have a tendency to be stored on the capacitances. This charge build-up is slow to discharge and will create inaccuracies in the electrical signals generated. By including the switches 73 and 85 the resistors 67 and 79 are taken out of the system for the first 20 seconds of operation. Statistically, the circuit 29-A experiences during the first 20 seconds after the probe is placed at the measuring site and the system is turned on most of the transient noise and turn-on noise which it will see. By taking these two resistances 67, 79 out of the system the capacitors can quickly discharge the turn-off transient noise and charge build-up.

This improved anticipation circuit 29-A may be said to operate as follows. After the thermistor probe 19 is placed into a temperature measuring environment probe 19 begins to heat up and the voltage output from the bridge circuit 23 begins to decrease in direct proportion to the increase in temperature of the probe 19 according to the curve 69, FIG. 4. This decreasing voltage signal appears on line 27 and is sent to the positive input of amplifier 71. The decreasing voltage signal for the first 20 seconds of operation is fed directly into this positive terminal of amplifier 71 because resistor 67 is shorted through switch 73. During the first 20 seconds, then, any rapid fluctuations in voltage caused by shifting of the probe in the measuring environment or any other perturbations entering the system such as the initial time constant or start-up time constant of the system are fed directly into capacitor 69 so that the positive terminal of the amplifier 71 closely tracks the input coming from the thermistor probe 19. At the end of 20 seconds the counter 87 opens the switch 73 so that the short is removed and the resistor 67 is reinserted into line 27 as input to the positive terminal of amplifier 71. With the introduction of resistor 67, in combination with capacitor 69, a low pass filter is affected whose time is approximately 2 seconds. Thus any rapid changes in voltage occurring as an output of the bridge circuit 23 are filtered out by this low pass filter. Such momentary interruption can be caused by momentary loss of contact between the thermistor probe 19 and the contact site; or between any electro-mechanical circuit contacts in the system 10; or by an introduction of cold air or some other factor at the temperature measuring site.

Additionally, during the first 20 seconds of operation, the resistor 79 is short-circuited out of the system by the second switch 85. With this condition existing, the output of amplifier 71 is connected directly to the positive input of the feedback amplifier 81 being connected as a voltage follower. This feedback loop includes the resistance 83 in series with the output of the amplifier 81 to the negative input of the amplifier 71. During the first 20 seconds of operation the output of amplifier 71 follows the input on its positive input terminal from line 27 which is fed to the summing point 31, the input of the integrator 33. This signal also appears on the positive input terminal of amplifier 81 and the output terminal of amplifier 81 and the negative input terminal of amplifier 71 through resistor 83.

The ratio of the resistor 75 to the resistor 83 determines the gain of the amplifier 71. At the end of the 20-second period when the output of the counter 87 opens the switch 85 the resistor 79 is again in the system. This resistor 79 taken with capacitor 91 establishes the time constant of the positive input to amplifier 81 so that this positive input to amplifier 81 follows somewhat more slowly the voltage path taken by the output of amplifier 71. Immediately upon the reintroduction of the resistor 79 at 20 seconds, the tracking time of discharge of capacitor 91 through the resistor 79 lags the rate of decrease of the voltage output by the amplifier 71. Thus, there is a positive going output signal created at the output terminal of the amplifier 81 which in turn appears on the negative input terminal of the amplifier 71. This positive going input on the negative terminal of amplifier 71 is more positive with respect to the positive terminal of the amplifier 71. This voltage difference is multiplied by the gain through the amplifier 71 as defined by the ratio of resistor 75 to resistor 83. This causes the output terminal of amplifier 71 to decrease even more rapidly as indicated by the sudden drop in the curve 99 as illustrated in FIG. 6. This corresponds to the sudden increase in the change in voltage at the positive input of the amplifier 71 and represents the correction signal at the output of amplifier 81. This positive going voltage keeps increasing and thus the negative going portion of the curve 99 keeps decreasing until the discharge rate of capacitor 91 matches the decreasing voltage output of the output terminal of amplifier 71. When the incremental change in voltage at the output of amplifier 71 matches the discharge rate of capacitor 91 the output of amplifier 71 stops changing, i.e., remains essentially constant and represents the final anticipated value. This steady state value is fed directly into integrator 33 and results in a display of the anticipated final temperature value on the display 41. When the power is turned off, the counter 87 is reset and the switches 73 and 85 are closed so that any charge on capacitor 69 and 91 is quickly discharged. The system, therefore, is reset for the next measuring cycle and charge build-up or lingering discharge contributing to erroneous charge build-up is eliminated.

The development of microelectronic circuit components has facilitated the use of more exacting circuit components than previously available. Typical circuit component values for the circuitry as shown in FIG. 5 are as listed:

| | |
|---|---|
| Resistance 67 — | 200K ohms |
| Resistance 75 — | 130K ohms |
| Resistance 79 — | 200K in series with a 100K trim resistor |
| Resistance 83 — | 10K ohms |
| Resistance 93 — | 56K ohms |
| Resistance 95 — | 41K ohms |
| Capacitor 69 — | 10 microfarads |
| Capacitor 77 — | .1 microfarads |
| Capacitor 91 — | 47 microfarads |
| Amplifier 71 — | RCA-CA324 |
| Amplifier 81 — | RCA-CA324 |
| Amplifier 89 — | RCA-CA324 |
| Switch 73 — | RCA-4016 (Quad bilator switch) |
| Switch 85 — | RCA-4016 (Quad bilator switch) |

The circuit configuration described herein is intended to be interpreted as illustrative and not to be taken in the limiting sense. Equivalent circuit substitutions may be made without departing from the scope of this invention. An alternate embodiment may include a ladder network of resistances similar to resistor 79 and switches similar to switch 85 may be connected across the output from amplifier 71 and the positive input to amplifier 81 for affecting various multiplication factors for creating additional various portions of an operational curve as illustrated in FIG. 6. Each step of the ladder may cut in at a different or successive time from time zero and at a different multiplication factor. This would enable the curve for this alternate embodiment to approach the asymptote equivalent to the steady state probe temperature value at a faster rate, and, therefore, yield the anticipated probe temperature value more quickly than previously. Such an alternate embodiment and others are anticipated as being within the scope of this invention.

What is claimed is:

1. An electronic thermometer system comprising: a temperature sensing circuit for providing an analog signal representative of a temperature being sensed, said temperature sensing circuit including a temperature sensing probe, a bridge circuit connected thereto, and an anticipation circuit means connected to the output of said bridge circuit, said anticipation circuit means including (i) means for providing a first output signal representative of a reference temperature signal, and (ii) means for generating a second output signal having seriate first and second portions, said first portion being representative of said sensing probe heat transfer response curve, and said second portion being a further scaled representation of said first portion, said means for generating including means for developing said second portion by scaled combination of respective first and second components, said first component involving a first multiplication scale factor and said second component involving a second multiplication scale factor, said means for developing applying said scale factors to respectively associated representations of said response curve;

a voltage to rate converter circuit responsive to said first and second output signals from said anticipation circuit for providing constant width and amplitude pulses proportional to the temperature being sensed;

a power and control circuit connected to said temperature sensing circuit and to said voltage to rate converter so as to control their operation; and a counting circuit having a display driven by a digital counter and decoder for displaying the temperature being sensed, said counting circuit being connected to said voltage to rate converter through said power and control circuit.

2. An electronic thermometer system comprising:

a temperature sensing circuit for providing an analog signal representative of a temperture being sensed, said temperature sensing circuit including a temperature sensing probe, a bridge circuit connected thereto, and an anticipation circuit means connected to the output of said bridge circuit, said anticipation circuit means providing a first output signal representative of a reference temperature signal and a second output signal having a first portion representative of said sensing probe heat transfer response curve, and a second portion having a first component with a first multiplication scale factor and a second component with a second multiplication scale factor;

a voltage to rate converter circuit responsive to said first and second output signals from said anticipation circuit for providing constant width and amplitude pulses proportional to the temperature being sensed;

a power and control circuit connected to said temperature sensing circuit and to said voltage to rate converter so as to control their operation; and a counting circuit having a display driven by a digital counter and decoder for displaying the temperature being sensed, said counting circuit being connected to said voltage to rate converter through said power and control circuit, wherein said anticipation means includes first means for providing said second output signal curve first portion during the first 20 seconds of operation of said circuit means, said first portion being directly proportional to said sensing probe heat transfer responsive curve, and second means for providing said second output signal second portion after 20 seconds of operation of said circuit means, said second portion having a first component being proportional to said probe heat transfer response curve and a second component being proportional to the signal difference generated by rate of change in said first component multiplied by a scale factor.

3. A predictive circuit for a temperature measuring electronic thermometer having a temperature sensing probe-bridge circuit providing a delayed output signal representative to temperature being measured, said probe-bridge output being responsive to the heat transfer response of said probe, said predictive circuit providing an output signal representative to said temperature being measured after said probe begins to change temperature and before said probe reaches final temperature; comprising: a means for providing a first signal being a differential of said probe heat transfer curve during a first time period, said first time period beginning when said probe begins to change temperature; and means for providing a second signal having a first component being proportional to a differential of said probe heat transfer curve and a second component being proportional to the signal difference generated by rate of change in said first component multiplied by a scale factor, said second signal being provided during a second time period beginning at a time after said probe begins to change, said second signal arriving at a value within tolerance of a value representative of said temperature being measured before said probe reaches said final temperature.

4. The circuit of claim 3 wherein said second signal providing means provides said first component signal as a multiplication scale factor of said first signal provided by said first signal providing means.

5. The circuit of claim 4 wherein said second signal component multiplication scale factor of 13.

6. The circuit of claim 5 wherein said second time period begins at 20 seconds after said probe begins to change temperature.

7. The circuit of claim 6 also including means for minimizing transient noise entering said first differential signal providing means, said transient noise minimizing means being connected between said probe-bridge circuit and said first signal providing means.

8. The circuit of claim 7 also including means for minimizing erroneous charge build-up, said charge build-up minimizing means being connected to said second signal providing means and said transient noise minimizing means.

* * * * *

UNITED STATES PATENT AND TRADEMARK OFFICE
CERTIFICATE OF CORRECTION

PATENT NO. : 4,092,863
DATED : June 6, 1978
INVENTOR(S) : Robert Bruce Turner

It is certified that error appears in the above-identified patent and that said Letters Patent are hereby corrected as shown below:

In Column 3, line 14, "thermometer" should read ---thermistor---
In Column 3, line 27, "unbalance" should read ---imbalance---
In Column 3, line 31, "100°F" should read ---110°F---
In Column 4, line 1, "point, therefore" should read
                                                   ---point, and therefore---
In Column 5, line 41, "or timmed" should read ---or trimmed---
In Column 7, line 40, "the turn-off" should read ---the turn-on---
In Column 7, line 65, "whose time is" should read
                                                 ---whose time constant is---
In Column 8, line 36, "input on the negative terminal" should read
                                                 ---input on the negative input terminal---
In Column 10, line 37, "responsive" should read ---response---
In Column 10, line 48, "representative to" should read
                                                 ---representative of---
In Column 10, line 51, "representative to" should read
                                                 ---representative of---
In Column 11, line 7, "factor of 13" should read ---factor is 13---

Signed and Sealed this

Fifth Day of June 1979

[SEAL]

Attest:

RUTH C. MASON
*Attesting Officer*

DONALD W. BANNER
*Commissioner of Patents and Trademarks*